(12) United States Patent
Reitzle et al.

(10) Patent No.: US 8,876,947 B2
(45) Date of Patent: Nov. 4, 2014

(54) METHOD AND DEVICE FOR REDUCING THE HUMIDITY OF A GAS IN A HOUSING INTERIOR

(75) Inventors: Alexander Reitzle, Neu-Ulm (DE); Ulrich Zimmermann, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 199 days.

(21) Appl. No.: 13/516,371

(22) PCT Filed: Oct. 28, 2010

(86) PCT No.: PCT/EP2010/066319
§ 371 (c)(1),
(2), (4) Date: Aug. 27, 2012

(87) PCT Pub. No.: WO2011/072936
PCT Pub. Date: Jun. 23, 2011

(65) Prior Publication Data
US 2012/0312161 A1    Dec. 13, 2012

(30) Foreign Application Priority Data

Dec. 18, 2009   (DE) .......................... 10 2009 054 921

(51) Int. Cl.
*B01D 53/26* (2006.01)
*B01D 53/22* (2006.01)
*H01M 10/42* (2006.01)
*H01M 10/0525* (2010.01)
*H01M 10/625* (2014.01)
*H01M 10/663* (2014.01)
*H01M 10/613* (2014.01)
*H01M 2/12* (2006.01)

(52) U.S. Cl.
CPC ... *H01M 10/4207* (2013.01); *B01D 2258/0208* (2013.01); *H01M 10/0525* (2013.01); *H01M 10/5016* (2013.01); *H01M 10/5095* (2013.01); *H01M 10/5004* (2013.01); *Y02E 60/12* (2013.01); *H01M 2/12* (2013.01); *Y02T 10/7011* (2013.01); *B01D 53/268* (2013.01)
USPC .................. 95/52; 95/10; 95/19; 95/45; 96/4; 96/9; 96/417; 96/421

(58) Field of Classification Search
CPC ............... B01D 53/226; B01D 53/268; B01D 2258/0208; H01M 2/12; H01M 2/1205; H01M 2/1217; H01M 2/1264; H01M 10/0525; H01M 10/5004; H01M 10/5095; H01M 10/4207; H01M 10/5016; Y02T 10/7011; Y02E 60/12
USPC ........ 96/4, 9, 417, 421; 95/10, 19, 45, 47, 52, 95/54
See application file for complete search history.

(56) References Cited

U.S. PATENT DOCUMENTS 4,931,070 A * 6/1990 Prasad ................................ 96/9
5,071,451 A * 12/1991 Wijmans ........................... 95/47

(Continued)

FOREIGN PATENT DOCUMENTS

DE    696 14 979 T2    4/2002
EP    1 048 339 A1    11/2000

OTHER PUBLICATIONS

International Search Report corresponding to PCT Application No. PCT/EP2010/066319, mailed Jan. 19, 2011 (German and English language document) (7 pages).

*Primary Examiner* — Jason M Greene
(74) *Attorney, Agent, or Firm* — Maginot, Moore & Beck LLP

(57) ABSTRACT

A method and a device for reducing the humidity of a gas in a housing interior, in particular in a battery housing interior, includes leading a gas through a first selectively permeable membrane and into an intermediate space. The intermediate space has the first selectively permeable membrane as an inlet and a second selectively permeable membrane as an outlet. The gas is then cooled in the intermediate space by a cooling unit such that a water vapor portion of the gas is condensed into water and the gas having a reduced water vapor content is directed through the second selectively permeable membrane into the housing interior.

11 Claims, 1 Drawing Sheet

(56) References Cited

U.S. PATENT DOCUMENTS

| | | | |
|---|---|---|---|
| 5,226,932 A * | 7/1993 | Prasad | 95/45 |
| 5,261,946 A | 11/1993 | Overby | |
| 5,401,300 A * | 3/1995 | Lokhandwala et al. | 95/51 |
| 5,538,536 A * | 7/1996 | Fuentes et al. | 95/45 |
| 5,575,835 A * | 11/1996 | Bailey et al. | 96/7 |
| 5,641,337 A * | 6/1997 | Arrowsmith et al. | 95/39 |
| 6,007,603 A * | 12/1999 | Garrett | 95/12 |
| 2003/0061938 A1* | 4/2003 | Kunstadt et al. | 96/4 |
| 2007/0000273 A1* | 1/2007 | Sanders | 62/285 |
| 2008/0295695 A1* | 12/2008 | Takeuchi | 96/108 |
| 2012/0118147 A1* | 5/2012 | Claridge et al. | 96/9 |
| 2013/0323545 A1* | 12/2013 | Gless et al. | 429/57 |

* cited by examiner

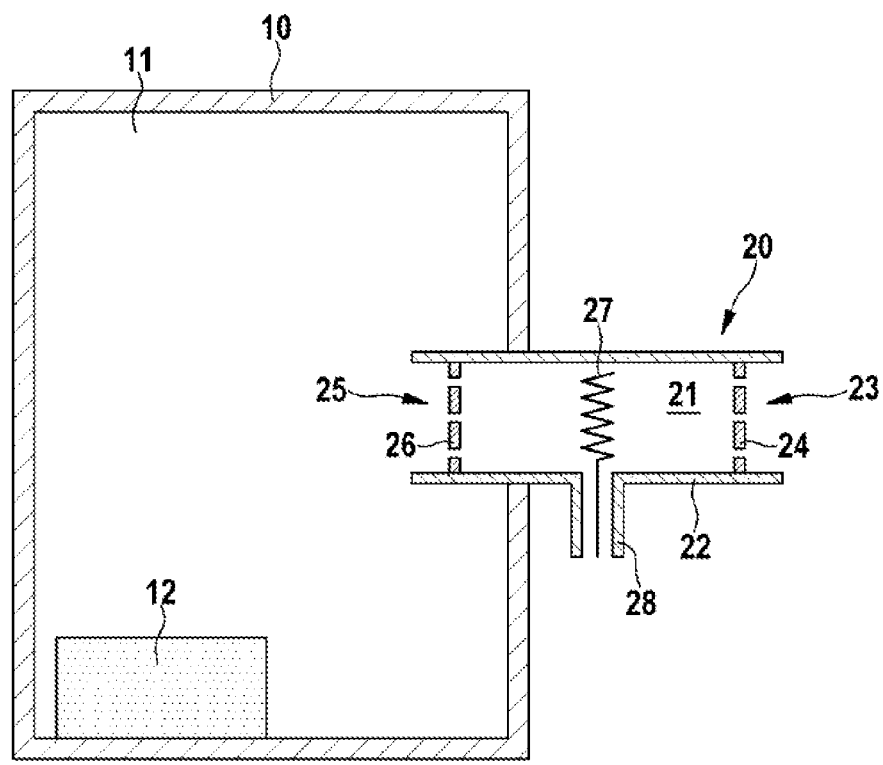

METHOD AND DEVICE FOR REDUCING THE HUMIDITY OF A GAS IN A HOUSING INTERIOR

This application is a 35 U.S.C. §371 National Stage Application of PCT/EP2010/066319, filed on Oct. 28, 2010, which claims the benefit of priority to Serial No. DE 10 2009 054 921.8, filed on Dec. 18, 2009 in Germany, the disclosures of which are incorporated herein by reference in their entirety.

BACKGROUND

The present disclosure relates to a method and a device for reducing the humidity of a gas in a housing interior, in particular in a battery housing interior.

The method and the device are preferably to be used for reducing the humidity of housing interiors, in which battery cells or batteries are arranged. Battery cells and batteries which are assembled from battery cells form, as is known, one or more accumulators which can be charged electrically and can be discharged again. Here, a battery cell is a single galvanic cell which supplies a characteristic voltage depending on the combination of the materials of the electrodes of the cell. Connected to one another in series or in parallel, the battery cells can form a battery.

In particular, lithium-ion batteries have been used recently increasingly in mobile radio devices, laptops and other portable, electronic devices. Moreover, the use of lithium-ion batteries as energy stores in motor vehicles which are to be driven electrically is rising more and more. In order to ensure sufficient operational reliability and power provision, the lithium-ion batteries are to be operated here in an optimum temperature range, for which reason one or more cooling systems are often arranged in the immediate vicinity of the batteries in order to cool the batteries. Said cooling systems are usually likewise arranged in a housing which encloses the batteries or battery cells. The housing assumes the functions of fastening, protecting the sealing effect with respect to the environment, and insulating the batteries electrically. Moreover, in addition to the battery modules and the cooling system which is configured as a thermal management system, power electronics and electric lines for controlling the batteries during the charging and discharging operations are usually arranged in the battery housing. On account of the size of a battery housing, a device for equalizing the pressure is required, since otherwise excessively pronounced loadings can occur in the case of pressure differences.

In housings with an enclosed air volume which are exposed to temperature and/or volumetric changes, membranes which are composed of Teflon or at least comprise Teflon have been used up to now as pressure equalization elements. Although a membrane of this type keeps out liquids such as water, it is permeable for water vapor. Accordingly, in a humid external atmosphere humid air can penetrate into the housing. In the case of cooled regions within the housing, such as cooling devices as thermal management systems for setting an optimum battery operating temperature, condensation of the air humidity can accordingly occur within the housing. The condensation water which accumulates during the condensation can lead to short circuits of the electronics accommodated in the housing and/or to corrosion of components.

SUMMARY

According to the disclosure, a method is provided for reducing the humidity of a gas in a housing interior, in particular in a battery housing interior, in which method a gas is guided through a first selectively permeable membrane into an intermediate space which has the first selectively permeable membrane as an inlet and a second selectively permeable membrane as an outlet, and the gas is subsequently cooled in the intermediate space by means of a cooling device in such a way that a water vapor fraction of the gas is condensed to form water and the gas with a reduced water vapor content is guided through the second selectively permeable membrane into the housing interior. Selectively permeable membranes of this type which are used can also be called semipermeable membranes which are permeable for gas and are impermeable for liquids. The intermediate space which is delimited by the membranes is otherwise substantially of gas-tight and liquid-tight configuration, apart from a possibly arranged outlet line.

Here, the gas which is accommodated in the housing before it is filled with the gas with a reduced water vapor fraction is usually air. The method according to the disclosure is not restricted to the introduction and discharge of pure gases, but rather gas mixtures are also to be understood as gases in the context of the disclosure.

The condensation water which is produced during the condensation is discharged from the intermediate space between the membranes. The method is suitable, in particular, for drying external air and introducing the dried external air into the housing through the second membrane. As a result of the introduction of the dried gas into the housing, the gas which was previously situated in the housing is either mixed with the dried gas or is displaced by the dried gas, with the result that the gas which is then situated in the housing as a result has a lower water vapor fraction than the gas which was originally accommodated in the housing.

The advantage of the method according to the disclosure consists, in particular, in the fact that external air with a defined water vapor fraction can pass through the first selectively permeable membrane into the intermediate space between the membranes and is first of all prevented from flowing into the housing interior by the second membrane. The space which is defined by the two membranes and the substantially impermeable walls of the intermediate space and in which the cooling device is situated is filled, on account of the water separation, with a gas with a lower water vapor fraction than the external air. Only this reduced-humidity gas can pass through the second membrane into the housing interior. Moreover, the second membrane seals the housing interior against the condensation water which has accumulated. As a result, relatively dry gas is introduced into the housing and the introduction of liquid and/or water vapor into the housing is avoided. The method can be used for reducing the humidity, in particular, in battery housings, in which cooled lithium-ion accumulators are arranged which serve as energy source for drive purposes.

The method is advantageously carried out when a pressure equalization operation is required between an increased surrounding air pressure and a housing interior pressure which is lower than the surrounding air pressure, gas which is dried by the cooling device being introduced into the housing for the purpose of pressure equalization. That is to say, the method according to the disclosure is used not only for humidity minimization in the housing, but also for realizing a pressure equalization operation, in which a pressure equalizing valve which is provided on the housing is opened and the dry gas which is produced by the cooling device is introduced into the housing. For this purpose, a control valve can be arranged downstream of the first membrane in the gas flow direction, which control valve regulates the flow of the dried gas into the housing interior in the case of a necessary pressure equalization operation.

In order to achieve optimum dryness in the housing interior and efficient performance of the method, it is provided that the cooling performance of the cooling device is controlled or regulated in accordance with the humidity of the gas which is guided or is to be guided through the first selectively permeable membrane and/or a pressure difference between the housing interior and the surroundings.

Moreover, according to the disclosure, a device is provided for reducing the humidity of a gas in a housing interior, in particular in a battery housing interior, which device comprises an intermediate space which has a first selectively permeable membrane as an inlet and a second selectively permeable membrane as an outlet, and in which intermediate space a cooling device is arranged between the membranes, by means of which cooling device surrounding air can be cooled in such a way that water can be produced as condensation liquid and gas with a reduced water vapor fraction can be produced, the first and the second selectively permeable membranes being permeable for gases in each case and at least the second selectively permeable membrane being impermeable for liquids, in particular water. It is preferably provided here that the first selectively permeable membrane is also impermeable for liquids. Here, the device according to the disclosure can be configured in such a way that it comprises the housing or, as an alternative, that it can be connected merely to an existing housing, in particular to a battery housing. Here, the device can also comprise a pressure equalizing valve which, in the direction of a gas which flows into the housing interior, can be arranged upstream of the first, between the first and the second or downstream of the second selectively permeable membrane. The introduction of dried gas into the housing interior therefore takes place only when a pressure equalization operation is performed, in particular in the case of different temperature and/or pressure conditions inside and outside the housing.

The cooling device is arranged in such a way that it is situated between the membranes in the gas flow direction; the cooling device is not necessarily to be arranged in the projection region of one or both membranes, but rather it is sufficient if a gas which is guided through the first membrane into the intermediate space comes into contact with the cooling device and can escape through the second membrane into the housing interior.

The device according to the disclosure achieves a situation where a gas which flows into the housing interior, such as surrounding air, is cooled before entry into the housing, in such a way that the water vapor fraction of the gas is separated as condensation water and the gas with a reduced water vapor fraction is guided into the housing interior, with the result that the humidity in the housing interior is reduced significantly. The condensation water which is produced is prevented from entering the housing interior by the second selectively permeable membrane. Here, substantially only that gas is dried which is situated between the two membranes, since the first membrane greatly reduces a volumetric flow of gas which is situated outside the housing into the gas-filled intermediate space, as a result of which the device can be operated very efficiently.

It is preferably provided here that at least one of the membranes comprises polytetrafluoroethylene as filter material. A membrane of this type is also known by the name Gore-Tex, said membrane having fine pores which are large enough to allow through gas which possibly also has a water vapor fraction, but is impermeable for water. In an alternative refinement, the membranes can also comprises different filter material than polytetrafluoroethylene, such as other plastics or ceramic or else fine-mesh metal grating; the membranes are to be configured in such a way that they act as filters which are permeable for gases in one direction for gases.

The device is configured advantageously, in particular, when its cooling device comprises at least one Peltier element or is formed by a Peltier element. Cooling of a Peltier element can be achieved by conducting current through the Peltier element. Here, said Peltier element can be arranged in such a way that it is let on one side into a wall of the intermediate space to such a depth that the heat which is generated during operation of the Peltier element is dissipated to the surroundings and therefore does not have a negative influence on the cooling of the gas in the intermediate space. If the Peltier element is used, it is therefore merely necessary to arrange the Peltier element in the described way and to conduct a current through the Peltier element, as a result of which the surface of the Peltier element is cooled and leads to the stated condensation.

In a further advantageous refinement of the device, it is provided that at least one outlet line is arranged at the intermediate space between the membranes, for discharging the condensation water which is produced during the cooling. Said output line discharges the condensate to the surroundings, in order to prevent an accumulation of the condensate in the intermediate space.

In a further refinement, it can be provided that a nonreturn valve is arranged in the outlet line, by way of which nonreturn valve a return flow of liquid which is situated in the outlet line into the intermediate space can be avoided. This ensures that the condensation water cannot flow back into the intermediate space.

In order to realize an inexpensive device and, in particular, cooling device, it is provided that the cooling device is a bypass of a cooling system for cooling a battery in the housing interior. In the case of the preferred use of the device according to the disclosure for drying the air in a battery housing interior, in which batteries which are cooled by means of a cooling system are arranged, a section or a branch of the battery cooling system can be laid into the intermediate space, which realizes the described cooling of the gas with the associated formation of condensation water. The arrangement of an extra cooling device in the intermediate space can therefore be avoided. This refinement is suitable, in particular, if active liquid cooling of the batteries in the housing is used.

In order to control or in order to regulate the cooling performance of the cooling device in accordance with the humidity of the gas which is guided or is to be guided through the first selectively permeable membrane and/or a pressure difference between the housing interior and the surroundings, a control and regulating unit is provided which can possibly be, in a similar way to the cooling device, a constituent part of an overall regulating and control unit which is used to control the battery.

In order to further reduce the humidity in the housing interior, it can be provided that a desiccant is arranged in the housing interior and/or in the intermediate space in order to absorb humidity. This desiccant can be, for example, silicone.

A method and a device are therefore provided according to the disclosure, by means of which the humidity of a gas which is accommodated in the housing interior can be kept below a critical value in a simple and reliable way, in particular in the case of a pressure equalization operation.

BRIEF DESCRIPTION OF THE DRAWING

The present disclosure will be described using the appended drawing.

Here, the single FIGURE shows a device 20 according to the disclosure for reducing the humidity, which device 20 is connected to a housing 10.

DETAILED DESCRIPTION

The housing 10 encloses a housing interior 11, to which the device 20 for reducing the humidity is connected. Said device 20 comprises an intermediate space 21 which is delimited by intermediate space walls 22 and by a first membrane 24 which provides an inlet 23 and a second membrane 26 which provides by an outlet 25. A cooling device 27 is situated in the intermediate space 21. An intermediate space wall 22 is interrupted by an outlet line 28.

It can be seen that the first membrane 24 borders on surrounding air, the first membrane 24 allowing, on account of its selective permeability, gas, and accordingly the external air, to pass into the intermediate space 21, but seals the latter with respect to liquids. As a result of the operation of the cooling device 27, the gas which is then accommodated in the intermediate space 21 is cooled in such a way that water vapor fractions of the gas condense to form water, said condensation water being discharged to the surroundings through the outlet line 28. In order to discharge the condensation water and to provide a seal with respect to the atmosphere, a nonreturn valve (not shown) can be arranged in the outlet line 28.

The gas with a reduced water vapor content which is situated in the intermediate space 21 can flow into the housing interior 11 through the outlet 25 which is formed by the second selectively permeable membrane 26. The fact that the second membrane 26 is likewise a membrane which is permeable for gases and impermeable for liquids ensures that condensation water which has accumulated in the intermediate space 21 cannot pass into the housing interior 11. Moreover, a pressure equalizing valve (not shown) can be arranged at the intermediate space 21, which pressure equalizing valve brings it about that the dried gas passes out of the intermediate space 21 into the housing interior 11 in the case of pressure differences between the housing interior and the surroundings.

During operation of the cooling device, exclusively gas with a reduced water vapor content is therefore guided into the housing interior 11, as a result of which the gas which is situated in the housing interior has a low humidity content, with the result that the generation of condensation water in the housing interior and/or corrosion are/is avoided.

Drying powder 12 can be used as shown in order to further reduce humidity in the housing interior.

In addition to the discharging of condensation water, the outlet line 28 can also serve to guide electric lines to the cooling device 27 which is preferably configured as a Peltier element.

Here, the present disclosure is not restricted to the arrangement of a Peltier element as cooling device 27, but rather it can also be provided that the cooling device 27 is a branch or a constituent part of a cooling system (not shown) which is arranged in the housing interior 11 for cooling the battery cells.

The invention claimed is:

1. A method for reducing the humidity of a gas in a battery housing interior, comprising:
    guiding a gas through a first selectively permeable membrane into an intermediate space which has the first selectively permeable membrane as an inlet and a second selectively permeable membrane as an outlet; and
    cooling the gas in the intermediate space by a cooling device in such a way that a water vapor fraction of the gas is condensed to form water and the gas with a reduced water vapor content is guided through the second selectively permeable membrane into the battery housing interior.

2. A method for reducing the humidity of a gas in a housing interior, comprising:
    guiding a gas through a first selectively permeable membrane into an intermediate space which has the first selectively permeable membrane as an inlet and a second selectively permeable membrane as an outlet;
    cooling the gas in the intermediate space by a cooling device in such a way that a water vapor fraction of the gas is condensed to form water and the gas with a reduced water vapor content is guided through the second selectively permeable membrane into the housing interior; and
    equalizing a pressure between an increased surrounding air pressure and a housing interior pressure which is lower than the surrounding air pressure, the gas which is dried by the cooling device being introduced into the housing for the purpose of the pressure equalization.

3. The method for reducing the humidity of a gas in a battery housing interior as claimed in claim 1, further comprising controlling or regulating a cooling performance of the cooling device in accordance with one or more of the humidity of the gas which is guided or is to be guided through the first selectively permeable membrane and a pressure difference between the battery housing interior and the surroundings.

4. A device for reducing the humidity of a gas in a housing interior, comprising:
    an intermediate space which has a first selectively permeable membrane as an inlet and a second selectively permeable membrane as an outlet; and
    a cooling device arranged in the intermediate space between the membranes, the cooling device being configured to cool surrounding air in such a way that water is produced as condensation liquid and gas is produced with a reduced water vapor fraction,
    wherein the first and the second selectively permeable membranes are permeable for gases in each case and at least the second selectively permeable membrane is impermeable for liquids, and
    wherein the cooling device is a bypass of a cooling system configured to cool a battery in the housing interior.

5. The device for reducing the humidity of a gas in a housing interior as claimed in claim 4, wherein at least one of the membranes comprises polytetrafluoroethylene as filter material.

6. The device for reducing the humidity of a gas in a housing interior as claimed in claim 4, wherein the cooling device comprises at least one Peltier element.

7. The device for reducing the humidity of a gas in a housing interior as claimed in claim 4, further comprising at least one outlet line arranged at the intermediate space between the membranes and configured to discharge the condensation water which is produced during the cooling.

8. The device for reducing the humidity of a gas in a housing interior as claimed in claim 7, further comprising a nonreturn valve arranged in the outlet line, the nonreturn valve configured to prevent a return flow of liquid which is situated in the outlet line into the intermediate space.

9. The device for reducing the humidity of a gas in a housing interior as claimed in claim 4, further comprising a control and regulating unit configured to one or more of control and regulate a cooling performance of the cooling device in accordance with one or more of the humidity of the gas which is guided or is to be guided through the first selectively permeable membrane and a pressure difference between the housing interior and the surroundings.

10. The method for reducing the humidity of a gas in a housing interior as claimed in claim 2, wherein the housing interior is a battery housing interior.

11. The device for reducing the humidity of a gas in a housing interior as claimed in claim 4, wherein the second selectively permeable membrane is impermeable for water.

\* \* \* \* \*